United States Patent
Matsumoto

(10) Patent No.: US 10,855,962 B2
(45) Date of Patent: Dec. 1, 2020

(54) PROJECTOR, COLOR CORRECTION SYSTEM, AND CONTROL METHOD OF PROJECTOR

(71) Applicant: SEIKO EPSON CORPORATION, Tokyo (JP)

(72) Inventor: Yuichiro Matsumoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/555,123

(22) Filed: Aug. 29, 2019

(65) Prior Publication Data
US 2020/0077058 A1 Mar. 5, 2020

(30) Foreign Application Priority Data
Aug. 30, 2018 (JP) .................. 2018-161460

(51) Int. Cl.
*H04N 9/31* (2006.01)
*G01J 3/51* (2006.01)
*G01J 3/50* (2006.01)
*G03B 21/20* (2006.01)
*G01J 3/46* (2006.01)

(52) U.S. Cl.
CPC ............ *H04N 9/3182* (2013.01); *G01J 3/465* (2013.01); *G01J 3/506* (2013.01); *G01J 3/51* (2013.01); *G03B 21/204* (2013.01); *H04N 9/3194* (2013.01)

(58) Field of Classification Search
CPC .. H04N 9/3182; H04N 9/3194; G03B 21/204; G01J 3/465; G01J 3/51; G01J 3/506
See application file for complete search history.

(56) References Cited

U.S. PATENT DOCUMENTS 5,479,524 A * 12/1995 Farrell ................ G01J 3/51
358/518
6,538,742 B1 * 3/2003 Ohsawa ............ H04N 9/3147
345/604
(Continued)

FOREIGN PATENT DOCUMENTS

JP  H07-220086 A   8/1995
JP  2005-286605 A  10/2005
(Continued)

*Primary Examiner* — Bao-Luan Q Le
(74) *Attorney, Agent, or Firm* — Dority & Manning P.A.

(57) ABSTRACT

A projector includes a measurement unit and a correction parameter generation unit. The measurement unit measures a color of image light of the image formed on a projection surface in terms of a plurality of colors constituting an RGB color system and a Z value in an XYZ color system. The correction parameter generation unit generates a correction parameter based on a first measurement value and a second measurement value. The first measurement value measured by the measurement unit is obtained by converting a measurement value of the color in the RGB color system into the color in the XYZ color system. The second measurement value measured by the measurement unit is a value in the XYZ color system. The measurement unit includes an optical filter having transmittance characteristics corresponding to spectral characteristics of blue light, in a wavelength range of a color light in the RGB color system.

11 Claims, 8 Drawing Sheets

(56) References Cited

U.S. PATENT DOCUMENTS

| | | | |
|---|---|---|---|
| 8,411,936 B2* | 4/2013 | Xiao | H04N 5/57 382/162 |
| 8,488,905 B2* | 7/2013 | Hayase | H04N 1/6088 382/276 |
| 8,870,393 B2* | 10/2014 | Kawahara | H04N 9/73 353/122 |
| 9,659,388 B1* | 5/2017 | Safaee-Rad | G09G 5/02 |
| 9,934,595 B2* | 4/2018 | Safaee-Rad | H04N 9/73 |
| 10,225,464 B2* | 3/2019 | Narikawa | H04N 5/23229 |
| 10,440,337 B2* | 10/2019 | Wada | G09G 5/32 |
| 10,511,815 B1* | 12/2019 | Pjanic | H04N 9/3182 |
| 10,542,240 B2* | 1/2020 | Murakami | H04N 9/3158 |
| 10,574,951 B2* | 2/2020 | Tarpan | G03B 21/2013 |
| 2003/0137610 A1* | 7/2003 | Ohsawa | H04N 9/3182 348/744 |
| 2004/0021672 A1* | 2/2004 | Wada | H04N 17/045 345/591 |
| 2004/0125376 A1 | 7/2004 | Magarill et al. | |
| 2005/0207046 A1 | 9/2005 | Tamura | |
| 2008/0123944 A1* | 5/2008 | Xiao | H04N 5/57 382/162 |
| 2010/0104176 A1* | 4/2010 | Hayase | H04N 1/6088 382/162 |
| 2010/0225887 A1 | 9/2010 | Sato et al. | |
| 2011/0001881 A1* | 1/2011 | Kawahara | H04N 17/045 348/649 |
| 2013/0016118 A1* | 1/2013 | Mizushiro | H04N 9/3182 345/589 |
| 2017/0140555 A1* | 5/2017 | Safaee-Rad | G06T 11/001 |
| 2017/0140556 A1* | 5/2017 | Safaee-Rad | G06T 11/001 |
| 2018/0278840 A1* | 9/2018 | Narikawa | H04N 9/31 |
| 2018/0343426 A1* | 11/2018 | Wada | H04N 9/3185 |
| 2019/0037185 A1* | 1/2019 | Tarpan | H04N 9/3182 |
| 2019/0199981 A1* | 6/2019 | Murakami | G03B 21/008 |

FOREIGN PATENT DOCUMENTS

| | | |
|---|---|---|
| JP | 2006-505012 A | 2/2006 |
| JP | 2010-145372 A | 7/2010 |
| JP | 2010-206584 A | 9/2010 |
| JP | 2014-187465 A | 10/2014 |

* cited by examiner

*FIG. 2*
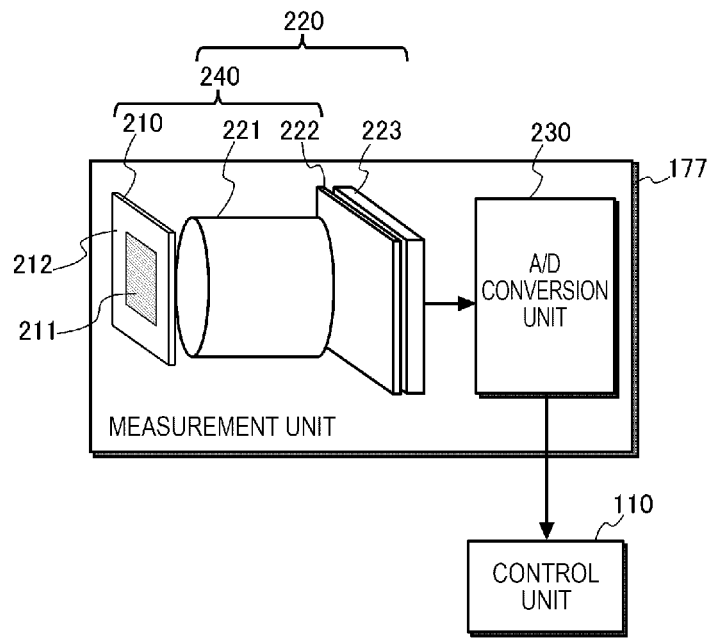
*FIG. 3*
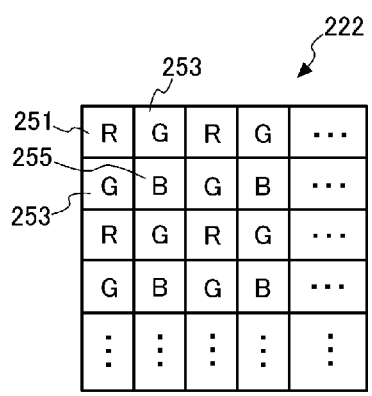
*FIG. 4*
| PROJECTION LIGHT | MEASUREMENT VALUE | CONVERSION VALUE | AIMED VALUE |
|---|---|---|---|
| R LIGHT | $(Rr1, Gr1, Zr1)$ | $(Xr1, Yr1, Z'r1)$ | $(Xr0, Yr0, Zr0)$ |
| G LIGHT | $(Rg1, Gg1, Zg1)$ | $(Xg1, Yg1, Z'g1)$ | $(Xg0, Yg0, Zg0)$ |
| B LIGHT | $(Rb1, Gb1, Zb1)$ | $(Xb1, Yb1, Z'b1)$ | $(Xb0, Yb0, Zb0)$ |

US 10,855,962 B2

PROJECTOR, COLOR CORRECTION SYSTEM, AND CONTROL METHOD OF PROJECTOR

The present application is based on, and claims priority from JP Application Serial Number 2018-161460, filed Aug. 30, 2018, the disclosure of which is hereby incorporated by reference herein in its entirety.

BACKGROUND

1. Technical Field

The present disclosure relates to a projector, a color correction system, and a control method of the projector.

2. Related Art

In the related art, a projector measures the color of image light and adjusts the color of the image light based on a result obtained by the color measurement. For example, JP-A-2010-145372 discloses a projector in which an optical filter that removes a predetermined spectral component is disposed on an optical path of the projector, and multiband measurement of 6 bands is realized in a pseudo manner by performing switching between a state where the optical filter is disposed on the optical path and a state where the optical filter is not disposed on the optical path.

SUMMARY

An advantage of some aspects of the present disclosure is to measure a color of an image with high accuracy and to perform color correction of image light.

An aspect of the present disclosure is directed to a projector including a solid light source that emits first color light, a light source optical system that obtains color light having a predetermined color by causing the first color light emitted by the solid light source to abut against a phosphor, and separates the color light having the predetermined color into second color light and third color light by spectrally dividing the obtained color light having the predetermined color, an optical modulation unit that modulates the first color light, the second color light, and the third color light, a projection unit that projects image light obtained by composing the first color light, the second color light, and the third color light modulated by the optical modulation unit, onto a projection surface, a measurement unit that measures a color of an image formed on the projection surface by the image light, in terms of a plurality of colors constituting a first color system and at least one of colors constituting a second color system, and a correction parameter generation unit that generates a correction parameter based on a conversion value and a second measurement value of at least the one of the colors constituting the second color system, which is measured by the measurement unit, the conversion value obtained by converting a first measurement value of the color in the first color system, which is measured by the measurement unit, into the color in the second color system. The measurement unit includes an optical filter having transmittance characteristics corresponding to spectral characteristics of the first color light, in a wavelength range of the first color light.

In the projector, the optical filter may have transmittance characteristics causing spectral sensitivity characteristics for the color constituting the first color system in the wavelength range of the first color light among spectral sensitivity characteristics of the measurement unit to correspond to a color matching function of the color constituting the second color system.

In the projector, the optical filter may include a first optical filter and a second optical filter, the second optical filter may have transmittance characteristics in which transmittance shows a peak in the wavelength range of the first color light, and the first optical filter may have transmittance characteristics causing spectral sensitivity characteristics for the color constituting the first color system in the wavelength range of the first color light to correspond to a color matching function of the color constituting the second color system, in combination with the transmittance characteristics of the second optical filter.

In the projector, the first optical filter may have transmittance characteristics in which the second color light and the third color light are transmitted in a wavelength range higher than the wavelength range of the first color light.

In the projector, in the first optical filter, transmittance in a wavelength range higher than the wavelength range of the first color light may be smaller than transmittance in the wavelength range of the first color light.

In the projector, the measurement unit may include a light receiving element. The optical filter may include a third optical filter having transmittance characteristics in which transmittance shows a peak in a wavelength range of the second color light and a fourth optical filter having transmittance characteristics in which transmittance shows a peak in a wavelength range of the third color light. The second optical filter, the third optical filter, and the fourth optical filter may be disposed to correspond to any of pixels constituting the light receiving element.

In the projector, the first optical filter may be disposed to correspond to each of the pixels constituting the light receiving element.

In the projector, the first color system may be an RGB color system, the second color system may be an XYZ color system, and the measurement unit may output a measurement value of each color of R and G constituting the RGB color system and Z constituting the XYZ color system.

Another aspect of the present disclosure is directed to a color correction system including a projector including a solid light source that emits first color light, a light source optical system that obtains color light having a predetermined color by causing the first color light emitted by the solid light source to abut against a phosphor, and separates the color light having the predetermined color into second color light and third color light by spectrally dividing the obtained color light having the predetermined color, an optical modulation unit that modulates the first color light, the second color light, and the third color light, a projection unit that projects image light obtained by composing the first color light, the second color light, and the third color light modulated by the optical modulation unit, onto a projection surface, and a measurement unit that measures a color of an image formed on the projection surface by the image light, in terms of a plurality of colors constituting a first color system and at least one of colors constituting a second color system; and a correction parameter generation device that generates a correction parameter based on a conversion value and a second measurement value of at least the one of the colors constituting the second color system, which is measured by the measurement unit, the conversion value being obtained by converting a first measurement value of the color in the first color system, which is measured by the measurement unit, into the color in the second color system. The measurement unit includes an optical filter having transmittance characteristics corresponding to spectral characteristics of the first color light, in a wavelength range of the first color light.

Still another aspect of the present disclosure is directed to a control method of a projector that modulates first color light emitted by a solid light source, second color light obtained based on the first color light, and third color light and projects image light obtained by composing the modulated first color light, second color light, and third color light onto a projection surface. The method includes measuring a color of an image formed on the projection surface by the image light in terms of a plurality of colors constituting a first color system and at least one of colors constituting a second color system, by a measurement unit, and generating a correction parameter based on a conversion value and a second measurement value of at least the one of the colors constituting the second color system, which is measured by the measurement unit, the conversion value being obtained by converting a first measurement value of the color in the first color system, which is measured by the measurement unit, into the color in the second color system. In the measuring of the color, the color is measured in terms of at least the one of the colors constituting the second color system, by the measurement unit including an optical filter having transmittance characteristics corresponding to spectral characteristics of the first color light, in a wavelength range of the first color light.

BRIEF DESCRIPTION OF THE DRAWINGS

FIG. 2 is a configuration diagram illustrating a measurement unit.

FIG. 3 is a diagram illustrating an example of arrangement of a filter constituting a color filter.

FIG. 4 is a diagram illustrating variables indicating a measurement value, a conversion value, and an aimed value.

DESCRIPTION OF EXEMPLARY EMBODIMENTS

Hereinafter, embodiments of the present disclosure will be described with reference to the accompanying drawings.

Figure 1:
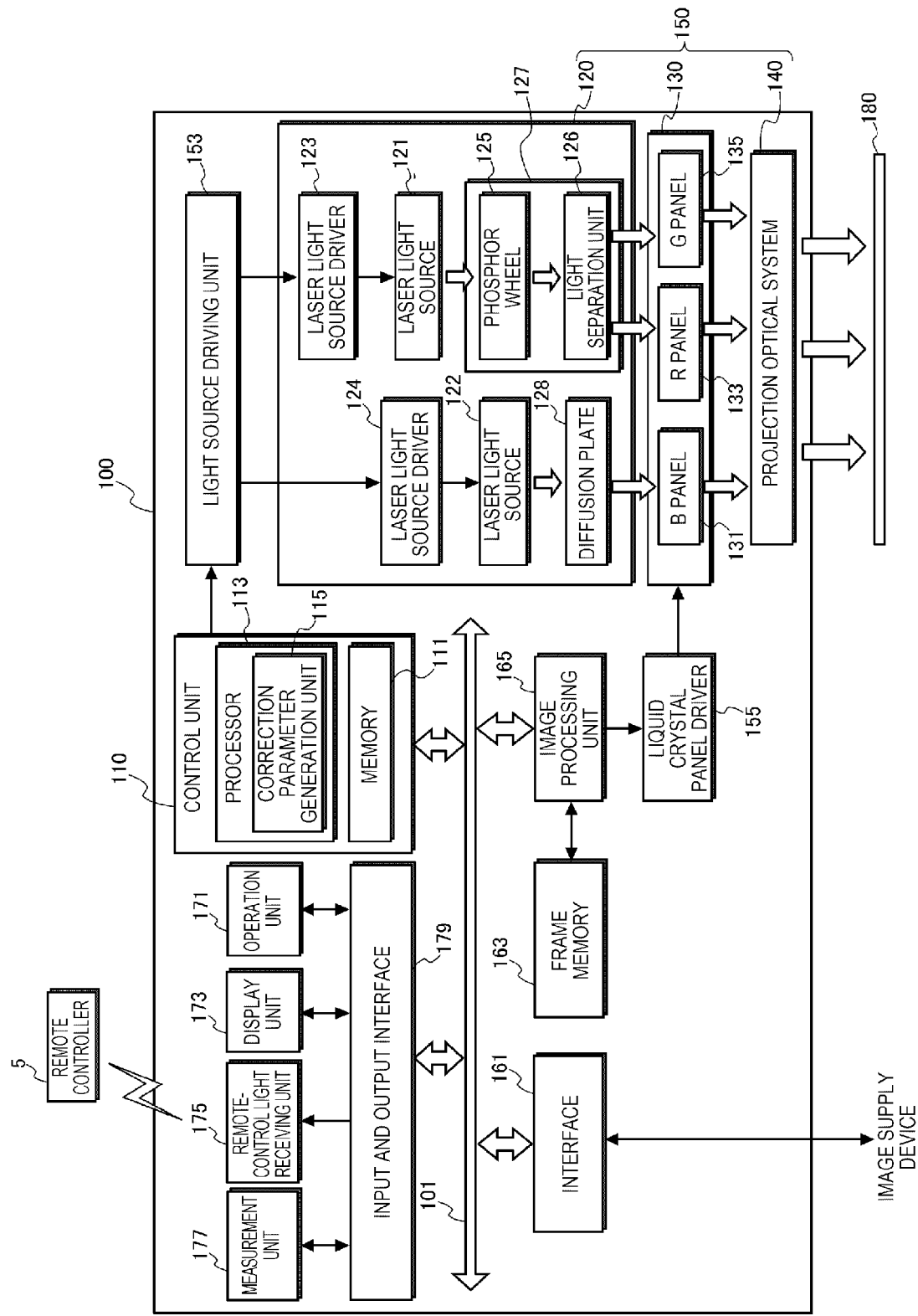
FIG. 1 is a configuration diagram illustrating a projector.

FIG. 1 is a configuration diagram schematically illustrating a configuration of a projector 100.

The projector 100 includes an image projection system, an image processing system, and a control unit 110. The image projection system includes, for example, a projection unit 150 that generates image light as an optical image and projects the image light onto a projection surface 180. The image processing system includes, for example, an image processing unit 165 that electrically processes image data as a source of the optical image. The control unit 110 controls the above components.

The projection unit 150 includes a light source unit 120, an optical modulation unit 130, and a projection optical system 140. The light source unit 120 includes laser light sources 121 and 122 as solid light sources. The laser light sources 121 and 122 are configured by blue semiconductor laser elements that emit blue laser light. The blue laser light will be described as blue light below. The blue light corresponds to "first color light" in the present disclosure. Each of the laser light sources 121 and 122 may have a configuration in which a plurality of semiconductor elements are provided, and each of the semiconductor elements emits blue light. The light source unit 120 may include an optical scanning element, a lens group, and a light control unit, for example. The optical scanning element performs scanning with blue light emitted by the laser light sources 121 and 122. The lens group is used for improving optical characteristics of the blue light. The light control unit reduces the light quantity. Illustrations of the optical scanning element, the lens group, and the light control unit are omitted.

The light source unit 120 further includes laser light source drivers 123 and 124, a light source optical system 127, and a diffusion plate 128. The light source optical system 127 includes a phosphor wheel 125 and a light separation unit 126.

The laser light source driver 123 drives the laser light source 121 in accordance with a control signal input from a light source driving unit 153 described later. The laser light source driver 124 drives the laser light source 122 in accordance with a control signal input from the light source driving unit 153.

The phosphor wheel 125 converts the blue light emitted from the laser light source 121 into yellow light having a complementary color. The yellow light corresponds to "color light having a predetermined color" in the present disclosure. The light separation unit 126 separates the yellow light incident from the phosphor wheel 125 into red light and green light. The red light corresponds to "second color light" or "third color light" in the present disclosure. The green light corresponds to "the third color light" or "the second color light" in the present disclosure. The diffusion plate 128 diffuses the blue light emitted from the laser light source 122.

The blue light emitted from the laser light source 121 is incident to phosphors of the phosphor wheel 125 and is converted into yellow light. The yellow light obtained by conversion is incident to the light separation unit 126 and is separated into red light and green light with a wavelength component. The red light and the green light obtained by separation of the light separation unit 126 are incident to the optical modulation unit 130 and are modulated to red image light and green image light, respectively.

The blue light emitted from the laser light source 122 is incident to the diffusion plate 128 and is diffused by the diffusion plate 128. The blue light diffused by the diffusion plate 128 is incident to the optical modulation unit 130 and is modulated to blue image light. The blue image light, the red image light, and the green image light obtained by modulation of the optical modulation unit 130 are composed by a composition optical system such as a cross dichroic prism (not illustrated), and light obtained by the composition is projected onto the projection surface 180 by the projection optical system.

The light source driving unit 153 controls the laser light source drivers 123 and 124 in accordance with control of the control unit 110 and controls turning-on and turning-off of the laser light sources 121 and 122 and the luminance of light emitted by the laser light sources 121 and 122.

The optical modulation unit 130 modulates the blue light, the red light, and the green light incident from the light source unit 120 so as to generate image light, and outputs the generated image light to the projection optical system 140. As a specific configuration of the optical modulation unit 130, for example, a type using three transmissive or reflective liquid crystal panels corresponding to the three primary colors of red, green, and blue or a digital light processing (DLP) type may be provided.

In the embodiment, a case where the optical modulation unit 130 includes three transmissive or reflective liquid crystal panels corresponding to color light of the three primary colors of red, green, and blue will be described. The liquid crystal panel for modulating blue light will be described as a B panel 131. The liquid crystal panel for modulating red light will be described as an R panel 133. The liquid crystal panel for modulating green light will be described as a G panel 135.

Each of the B panel 131, the R panel 133, and the G panel 135 has a configuration in which a plurality of pixels are arranged in a matrix. Each of the pixels is driven by a liquid crystal panel driver 155.

The liquid crystal panel driver 155 generates a driving voltage for driving each of pixels constituting each of the B panel 131, the R panel 133, and the G panel 135, based on an image signal input from the image processing unit 165 described later. The liquid crystal panel driver 155 applies the generated driving voltage to a transparent electrode (not illustrated) so as to adjust transmittance of each of the pixels constituting each of the B panel 131, the R panel 133, and the G panel 135 and draws an image on the B panel 131, the R panel 133, and the G panel 135. The red light, the green light, and the blue light modulated by the optical modulation unit 130 are composed by the cross dichroic prism, and thereby image light is obtained. The image light is emitted to the projection optical system 140.

The projection optical system 140 includes the lens group for forming an image by projecting the image light obtained by modulation of the optical modulation unit 130 onto the projection surface 180. In the projection optical system 140, the lens group is driven by rotation of a motor (not illustrated) so as to adjust the zoom, the focus, and the aperture. Illustrations of the lens group and the motor are omitted. The projection optical system 140 may have a configuration in which the lens group moves by a manual operation so as to adjust the zoom, the focus, and the aperture.

The projector 100 includes an operation unit 171, a display unit 173, a remote-control light receiving unit 175, a measurement unit 177, and an input and output interface 179. The operation unit 171, the display unit 173, the remote-control light receiving unit 175, and the measurement unit 177 are coupled to the input and output interface 179. The input and output interface 179 is coupled to a bus 101 so as to transmit and receive data to and from the control unit 110 similarly coupled to the bus 101, via the bus 101.

The operation unit 171 includes various buttons or switches provided on the surface of a casing of the projector 100. The operation unit 171 generates an operation signal corresponding to an operation of the button or switch and outputs the operation signal to the input and output interface 179. The input and output interface 179 outputs the operation signal input from the operation unit 171 to the control unit 110.

The display unit 173 includes a display panel such as a liquid crystal display (LCD) and displays an image, a figure, a character, and the like by control of the control unit 110. A touch panel as the operation unit 171 may be disposed under the display panel to overlap the display panel and may be capable of detecting the touched position of the display panel by the touch panel.

The remote-control light receiving unit 175 receives an infrared signal transmitted from a remote controller 5. The remote-control light receiving unit 175 decodes the received infrared signal to generate an operation signal and outputs the operation signal to the input and output interface 179. The input and output interface 179 outputs the operation signal input from the remote-control light receiving unit 175 to the control unit 110.

The measurement unit 177 images the projection surface 180 onto which the image light is projected by the projection unit 150 and measures the color of an image formed on the projection surface 180 by the image light. In the embodiment, the measurement unit 177 measures the colors of red, green, and blue.

FIG. 2 is a configuration diagram illustrating a configuration of the measurement unit 177.

Here, the configuration of the measurement unit 177 will be described with reference to FIG. 2. The measurement unit 177 includes a filter unit 210, an imaging unit 220, and an A/D conversion unit 230. The imaging unit 220 is configured by an RGB camera including an imaging lens 221, a color filter 222, and a light receiving element 223. The imaging unit 220 measures the color of an image formed on the projection surface 180 by the image light, in terms of each of the colors constituting an RGB color system. The RGB color system corresponds to "a first color system" in the present disclosure.

The filter unit 210 includes a Z filter 211 and a fixation member 212 that fixes the Z filter 211. The filter unit 210 is provided in front of the imaging lens 221. The Z filter 211 corresponds to "a first optical filter" in the present disclosure. The Z filter 211 constitutes a portion of an optical filter 240 provided in the measurement unit 177. The optical filter 240 is configured from the Z filter 211 and the color filter 222.

The Z filter 211 is an optical filter that changes light receiving characteristics of the light receiving element 223. The Z filter 211 has characteristics that bring spectral transmittance characteristics of the imaging unit 220 close to the characteristics of the human eye in a preset wavelength range. Specifically, the spectral transmittance of the Z filter 211 is adjusted by the product with the spectral transmittance of the color filter 222 so as to be identical to spectral transmittance characteristics of a color matching function $z(\lambda)$. That is, the spectral transmittance of the Z filter 211 is adjusted such that the spectral transmittance of color light transmitted through the Z filter 211 and the color filter 222 matches with the spectral sensitivity of the color matching function $z(\lambda)$. Thus, the imaging unit 220 performs imaging with the color light transmitted through the Z filter 211 and the color filter 222, and thereby it is possible to measure a Z value as a Z component of a tristimulus value in the XYZ color system. The color matching function is a function configured to reproduce spectral sensitivity distribution of the human eye, and is standardized by the International Commission on Illumination (CIE). According to the CIE standard, the color matching function reflects that the human has three-dimensional color coordinates. Three color matching functions of $x(\lambda)$, $y(\lambda)$, and $z(\lambda)$ are defined. $\lambda$ indicates a wavelength. The XYZ color system is also referred to as a CIE1931 color system and corresponds to "a second color system" in the present disclosure.

The filter unit 210 is installed such that the Z filter 211 is located at a first position in front of the color filter 222. In the embodiment, the Z filter 211 may be fixedly installed in front of the color filter 222 or may be held to be slidable in the measurement unit 177, in accordance with the characteristics of the Z filter 211. In this case, the filter unit 210 moves along a slide rail and moves between the first position and a second position, by driving the motor. The second position is a position at which the Z filter 211 is not located in front of the color filter 222. That is, when the filter unit 210 is at the second position, light is incident to the color filter 222 without being transmitted through the Z filter 211. When the Z filter 211 is at the first position, light transmitted through the Z filter 211 is transmitted through any of an R filter 251, a G filter 253, and a B filter 255. The light transmitted through the filter is received by any of pixels constituting the light receiving element 223.

The imaging lens 221 is a condensing lens that condenses light passing through the imaging lens 221 on each element constituting the light receiving element 223.

The color filter 222 separates light in a manner of causing light having a specific wavelength in light condensed by the imaging lens 221 to be transmitted through the color filter 222. FIG. 3 is a diagram illustrating an example of arrangement of a filter constituting the color filter 222. The color filter 222 has a configuration in which three types of filters which are the R filter 251 causing red light to be transmitted through the R filter 251, the G filter 253 causing green light to be transmitted through the G filter 253, and the B filter 255 causing blue light to be transmitted through the B filter 255 are two-dimensionally arranged in a predetermined pattern. The B filter 255 corresponds to "a second optical filter" in the present disclosure. The R filter 251 corresponds to "a third optical filter" in the present disclosure. The G filter 253 corresponds to "a fourth optical filter".

The B filter 255 as the second optical filter has transmittance characteristics in which transmittance shows a peak in a wavelength range of blue light, for example, in a wavelength range of 445 nm to 465 nm. The R filter 251 as the third optical filter has transmittance characteristics in which transmittance shows a peak in a wavelength range of red light, for example, in a wavelength range of 620 nm to 750 nm. The G filter 253 as the fourth optical filter has transmittance characteristics in which transmittance shows a peak in a wavelength range of green light, for example, in a wavelength range of 495 nm to 570 nm.

The light receiving element 223 is configured by a charge-coupled device (CCD) image sensor or a complementary metal oxide semiconductor (CMOS) image sensor. The light receiving element 223 has a configuration in which a plurality of pixels, each including a photoelectric conversion element, are two-dimensionally arranged.

Each pixel constituting the light receiving element 223 is correlated with any of the R filter 251, the G filter 253, and the B filter 255 of the color filter 222. The light receiving element 223 photoelectrically converts light passing through any of the R filter 251, the G filter 253, and the B filter 255 for each pixel, and accumulates charges corresponding to the quantity of received light. The light receiving element 223 sequentially outputs an analog signal having a voltage corresponding to the accumulated charges, based on a signal input at a predetermined timing.

The Z filter 211 is disposed to correspond to each pixel constituting the light receiving element 223. That is, light transmitted through the Z filter 211 is transmitted through any of the R filter 251, the G filter 253, and the B filter 255. The light transmitted through the filter is received by any of the pixels constituting the light receiving element 223.

The A/D conversion unit 230 performs processing, for example, sampling, gain adjustment, and A/D conversion, on the analog signal output by the light receiving element 223 and outputs a digital signal obtained by the above processing. The digital signal obtained by the conversion of the A/D conversion unit 230 is input to the control unit 110 as a measurement value.

FIG. 2 illustrates a configuration in which the filter unit 210 is provided in front of the imaging lens 221. However, the filter unit 210 may be provided between the Z filter 211 and the color filter 222.

Next, the image processing system of the projector 100 will be described.

The projector 100 includes an interface 161, a frame memory 163, the image processing unit 165, and the control unit 110 as the image processing system.

The interface 161 includes a connector for wired coupling and an interface circuit corresponding to the connector. The interface 161 is coupled to an image supply device that supplies image data to the projector 100, in a wired manner. In FIG. 1, illustrations of the connector and the interface circuit are omitted. The interface 161 outputs image data received from the image supply device to the image processing unit 165.

FIG. 1 illustrates a case where the projector 100 and the image supply device are coupled to each other in a wired manner. However, the projector 100 and the image supply device may be coupled to each other in a wireless manner. The image data may be received from the image supply device or may be stored in a memory 111 of the control unit 110 in advance.

The image processing unit 165 develops the image data in the frame memory 163. The frame memory 163 includes a plurality of banks. Each of the banks has storage capacity capable of writing one frame of image data. The frame memory 163 is configured by a synchronous dynamic random access memory (SDRAM), for example.

The image processing unit 165 performs image processing, for example, as follows, on the image data developed in the frame memory 163: resolution conversion processing or resizing processing, distortion correction processing, shape correction processing, digital zoom processing, and adjustment of hue or luminance of an image. The image processing unit 165 performs processing designated by the control unit 110. If necessary, the image processing unit 165 performs processing using a parameter input from the control unit 110. The image processing unit 165 may perform combination of plural types of image processing among the above-described types of processing. The image processing unit 165 reads the image data subjected to the image processing, from the frame memory 163 and outputs the image data to the liquid crystal panel driver 155 in a form of an image signal.

The control unit 110 includes the memory 111, a processor 113, and peripheral circuits. In FIG. 1, the illustration of the peripheral circuit is omitted. The memory 111 refers to a storage device. The memory 111 may be configured by a non-volatile storage device or may be configured by a non-volatile storage device and a volatile storage device. For example, the non-volatile storage device may be configured by a semiconductor memory such as an EEPROM or a flash memory. For example, the volatile storage device may be configured by a RAM. The memory 111 stores a control program executed by the processor 113, parameters used in image processing, and the like.

The processor 113 may be configured by a single processor or may be configured by a plurality of processors. The processor 113 may be configured by a system on a chip (SoC) obtained by integrating a portion or the entirety of the memory 111 and other circuits. The processor 113 may be configured by a combination of a CPU executing a program and a digital signal processor (DSP) performing an arithmetic operation. All functions of the processor 113 may be mounted in hardware or may be configured using a programmable device.

The control unit 110 and the image processing unit 165 may be each independently or integrally configured by a hardware circuit such as a field-programmable gate array (FPGA) or an application specific integrated circuit (ASIC). The control unit 110 and the image processing unit 165 may be each independently or integrally configured by a central processing unit (CPU) or a microprocessor unit (MPU) that executes a program to realize a predetermined function.

The processor 113 executes the control program stored by the memory 111 to control the components of the projector 100. For example, the processor 113 outputs an instruction to perform image processing corresponding to an operation received by the operation unit 171 or the remote controller 5 and outputs parameters used in the image processing, to the image processing unit 165. For example, the parameters include a geometric correction parameter for correcting geometric distortion of an image projected onto the projection surface 180. The processor 113 controls the light source driving unit 153 to control the laser light source drivers 123 and 124, controls turning-on and turning-off of the laser light sources 121 and 122, and adjusts the luminance. The geometric correction parameter is a generally-known parameter, and thus detailed descriptions of the geometric correction parameter will be omitted.

The processor 113 includes a correction parameter generation unit 115 as a function block. The function block refers to a block corresponding to a function realized by the processor 113 performing a control operation in accordance with a program.

The correction parameter generation unit 115 generates a correction parameter for correcting the hue of an image. The correction parameter generation unit 115 outputs the generated correction parameter to the image processing unit 165.

The projector 100 measures the color of an image in a manner that the imaging unit 220 images the image projected onto the projection surface 180 by the projection unit 150. The projector 100 performs color correction of correcting the color of the image projected by the projection unit 150 based on the measured color. The image processing unit 165 performs correction processing of correcting the brightness or the hue of image data by using correction parameters.

FIG. 4 illustrates variable indicating the measurement value, the conversion value, and an aimed value. Details of the measurement value, the conversion value, and the aimed value will be described later. An operation of the projector 100 will be described below with reference to FIG. 4.

The aimed value in color correction is stored in the memory 111 of the control unit 110. The aimed value is obtained before shipment of the projector 100, in a manner that the primary color light is projected by the projection unit 150, and the color of an image formed on the projection surface 180 is measured by a dedicated colorimeter. The primary color light includes R light as red single color light, G light as green single color light, and B light as blue single color light. The colorimeter measures the image formed on the projection surface 180, and outputs an X value, a Y value, and a Z value which are tristimulus values in the XYZ color system, as colorimetric values. The colorimetric value when R light is measured by the colorimeter is described as $(X_r, Y_r, Z_r)$. The subscript "r" described with X, Y, and Z indicates that the colorimetric value is obtained by measuring the R light. Similarly, the colorimetric value when G light is measured by the colorimeter is described as $(X_g, Y_g, Z_g)$. The subscript "g" described with X, Y, and Z indicates that the colorimetric value is obtained by measuring the G light. The colorimetric value when B light is measured by the colorimeter is described as $(X_b, Y_b, Z_b)$. The subscript "b" described with X, Y, and Z indicates that the colorimetric value is obtained by measuring the B light. The aimed values stored in the memory 111 are described as $(X_{r0}, Y_{r0}, Z_{r0})$, $(X_{g0}, Y_{g0}, Z_{g0})$, and $(X_{b0}, Y_{b0}, Z_{b0})$. $(X_{r0}, Y_{r0}, Z_{r0})$, $(X_{g0}, Y_{g0}, Z_{g0})$, and $(X_{b0}, Y_{b0}, Z_{b0})$ are collectively described as an aimed value $X_0Y_0Z_0$.

In the projector 100, the imaging unit 220 images the projection surface 180 onto which the R light, the G light, and the B light are projected by the projector 100. The imaging unit 220 is configured by the RGB camera. Thus, an R value, a G value, and a B value are obtained as measurement values, by the image of the imaging unit 220. The measurement value obtained by the image are described as $R_1G_1Z_1$. The measurement value when a projection of the R light is imaged by the imaging unit 220 is described as $(R_{r1}, G_{r1}, Z_{r1})$. The measurement value when a projection of the G light is imaged by the imaging unit 220 is described as $(R_{g1}, G_{g1}, Z_{g1})$. The measurement value when a projection of the B light is imaged by the imaging unit 220 is described as $(R_{b1}, G_{b1}, Z_{b1})$. The subscripts "r", "g", and "b" are similar to those in a case of the X value, the Y value, and the Z value.

A conversion parameter M is stored in the memory 111. The conversion parameter M is a 3×3 determinant of converting the measurement values $(R_{r1}, G_{r1}, Z_{r1})$, $(R_{g1}, G_{g1}, Z_{g1})$, and $(R_{b1}, G_{b1}, Z_{b1})$ into XYZ values. The calculation expression of the conversion parameter M is represented by Expression (1).

$$M = \begin{pmatrix} X_{r0} & X_{g0} & X_{b0} \\ Y_{r0} & Y_{g0} & Y_{b0} \\ Z_{r0} & Z_{g0} & Z_{b0} \end{pmatrix} \begin{pmatrix} R_{r1} & R_{g1} & R_{b1} \\ G_{r1} & G_{g1} & G_{b1} \\ Z_{r1} & Z_{g1} & Z_{b1} \end{pmatrix}^{-1} \quad (1)$$

Figure 5:
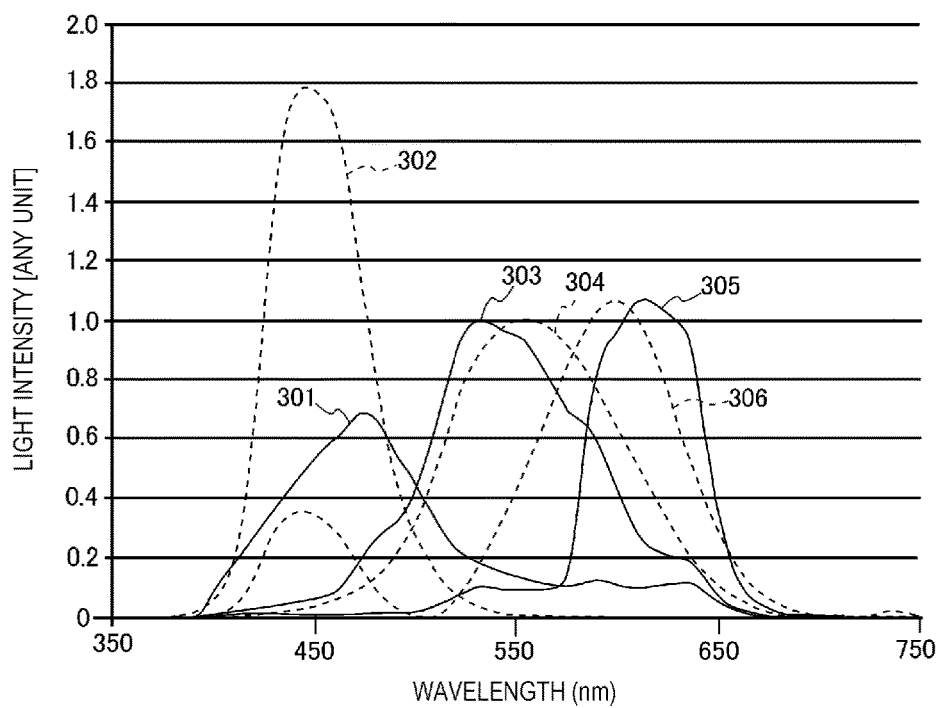
FIG. 5 is a graph illustrating spectral sensitivity characteristics of an imaging unit and spectral sensitivity characteristics of a color matching function.

Here, the reason of setting the aimed value in color correction by not RGB values but XYZ values in the XYZ color system is described. FIG. 5 is a graph illustrating the spectral sensitivity characteristics of the imaging unit 220 and the spectral sensitivity characteristics of the color matching function.

A curve 301 indicated by a solid line in FIG. 5 indicates spectral sensitivity of the imaging unit 220 that images the B light. A curve 302 indicated by a broken line indicates spectral sensitivity of the color matching function $z(\lambda)$. A curve 303 indicated by a solid line indicates spectral sensitivity of the imaging unit 220 that images the G light. A curve 304 indicated by a broken line indicates spectral sensitivity of the color matching function $y(\lambda)$. A curve 305 indicated by a solid line indicates spectral sensitivity of the imaging unit 220 that images the R light. A curve 306 indicated by a broken line indicates spectral sensitivity of the color matching function $x(\lambda)$. FIG. 5 illustrates a state where the maximum value of light intensity in the spectral sensitivity (indicated by the curve 303) of the imaging unit 220 that images the G light and the spectral sensitivity (indicated by the curve 304) of the color matching function y(λ) is normalized to "1.0".

Generally, the spectral sensitivity of the imaging unit 220 does not coincide with the spectral sensitivity of the color matching function, as illustrated in FIG. 5, in many cases. The color matching function indicates the sensitivity distribution of human eyes, and has a characteristic which is close to the sensitivity when a person actually sees an object. Therefore, if color correction is performed based on a result obtained by imaging of the imaging unit 220, or if the spectral sensitivity of the imaging unit 220 is not approximate to the spectral sensitivity of the color matching function, a preferable correction result may not be obtained when seen by the human eyes. Therefore, the aimed value in color correction is set by the XYZ values as the tristimulus values in the XYZ color system, and the measurement value $R_1G_1B_1$ obtained from the image of the imaging unit 220 is converted into the XYZ value. The value obtained by converting the measurement value $R_1G_1B_1$ is described as a conversion value $X_1Y_1Z_1$. The correction parameter is generated based on the conversion value $X_1Y_1Z_1$ and the aimed value $X_0Y_0Z_0$. Thus, it is possible to perform color correction at sensitivity in accordance with sensitivity distribution of the human eye.

The laser light sources 121 and 122 have wavelength spectra which change by an influence of aging and a temperature change. When the wavelength spectrum changes, if the $R_1G_1B_1$ value obtained from the image of the imaging unit 220 is converted into the $X_1Y_1Z_1$ value, the converted $X_1Y_1Z_1$ value may include an error, and thus an accurate measurement result may not be obtained.

In the embodiment, the projector 100 has a configuration in which the B light which is emitted from the laser light source 122 and then is diffused by the diffusion plate 128 is caused to be incident to the optical modulation unit 130, and image light is generated by modulating the incident B light. That is, regarding the B light, light itself emitted by the laser light source 122 is used. Therefore, when the temperature change, the aging or the like occurs in the laser light source 122, the spectrum of the B light may be deformed, and thus a wavelength position at which a peak is shown may be shifted.

Figure 6:
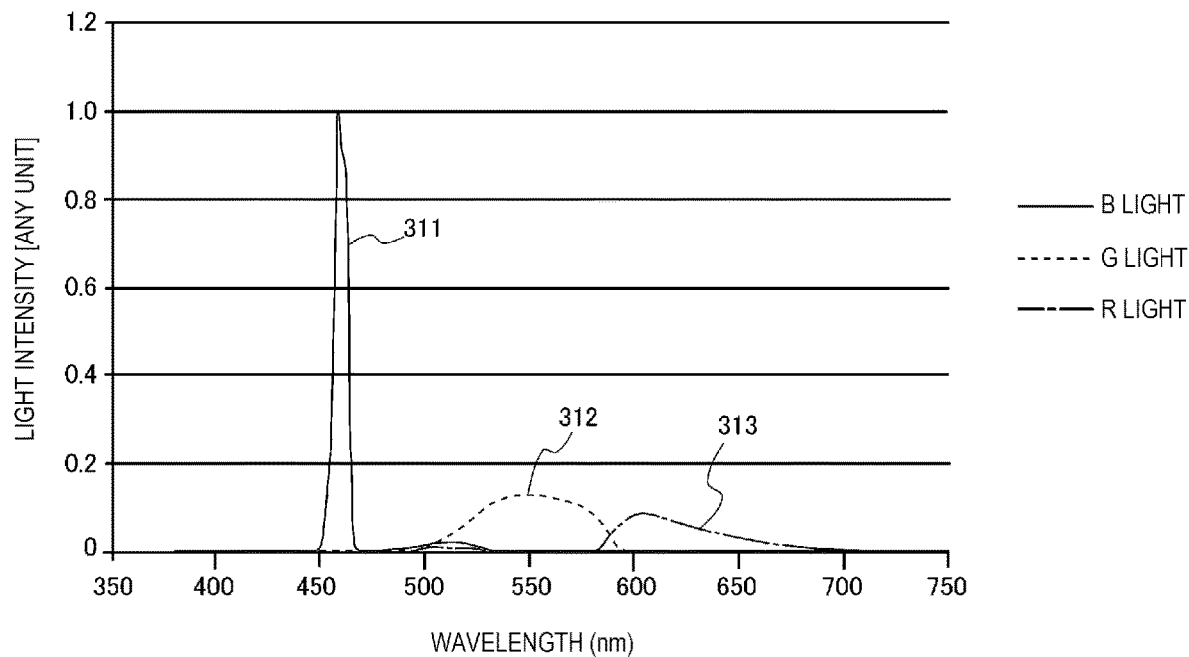
FIG. 6 is a graph illustrating spectral wavelength characteristics of projection light.

FIG. 6 is a graph illustrating the spectral wavelength characteristics of light projected by the projection unit 150. In FIG. 6, a horizontal axis indicates a wavelength, and a vertical axis indicates light intensity. The unit of wavelength is a nanometer, and the unit of light intensity is randomly determined. A curve 311 indicated by a solid line in FIG. 6 indicates spectral wavelength characteristics of the B light. A curve 312 indicated by a broken line indicates spectral wavelength characteristics of the G light. A curve 313 indicated by a one-dot chain line indicates spectral wavelength characteristics of the R light. The waveform showing the spectral wavelength characteristics of the B light has a sharp peak in the vicinity of 460 nm and has a narrow half width, as illustrated in FIG. 6. On the contrary, the waveforms showing the spectral wavelength characteristics of the R light and the G light are waveforms which have a wide half width and do not have a peak.

The projector 100 converts the B light emitted by the laser light source 121 into yellow light by the phosphor wheel 125 and separates the converted yellow light into red light and green light by the wavelength component so as to generate R light or G light. As illustrated in FIG. 6, the R light or the G light has a wide half width, and thus an error occurring in the measurement value obtained by an image obtained by imaging of the imaging unit 220 is small even through the spectrum shape changes or a peak wavelength is shifted, by the temperature change or the aging.

Figure 7:
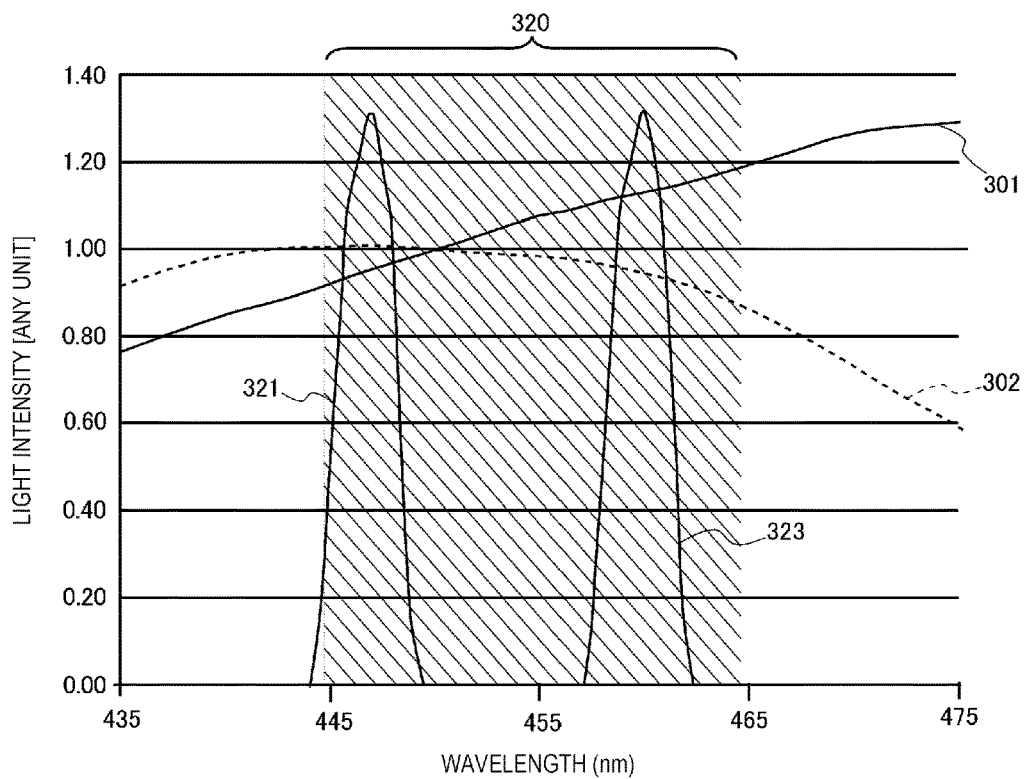
FIG. 7 is a graph illustrating spectral wavelength characteristics of B light projected by a projection unit.

FIG. 7 is a partially-enlarged view of FIG. 6. FIG. 7 is a graph illustrating the spectral wavelength characteristics of the B light in a range of 435 nm to 475 nm and further illustrating a state where the wavelength position showing the peak in the B light is shifted. A curve 321 illustrated in FIG. 7 indicates the spectral wavelength characteristics of the B light before the wavelength position showing a peak is shifted. A curve 323 indicates the spectral wavelength characteristics of the B light after the wavelength position showing a peak is shifted. In FIG. 7, a wavelength range 320 indicated by hatching indicates a shift range of the wavelength of the B light.

In FIG. 7, the curve 301 indicated by a solid line indicates the spectral sensitivity of the imaging unit 220. The curve 302 indicated by a broken line indicates the spectral sensitivity of the color matching function z(λ). That is, the curve 302 corresponds to the sensitivity of the human eye. In FIG. 7, a position at which the curve 301 intersects the curve 321 is lower than a position at which the curve 302 intersects the curve 321. That is, when the curve 321 indicates the spectral wavelength characteristics of the B light, the B light is shown darker than that sensed by the human eyes in an image obtained by imaging of the imaging unit 220.

In FIG. 7, light intensity at the position at which the curve 301 intersects the curve 323 is higher than light intensity at a position at which the curve 302 intersects the curve 323. That is, when the curve 323 indicates the spectral wavelength characteristics of the B light, the B light is shown brighter than that sensed by the human eyes in an image obtained by imaging of the imaging unit 220.

Therefore, in the embodiment, the projector 100 is configured such that the Z filter 211 for creating the characteristics of the color matching function Z(λ) is provided in front of the imaging unit 220, and the Z value among the tristimulus values is measured by the imaging unit 220.

Figure 8:
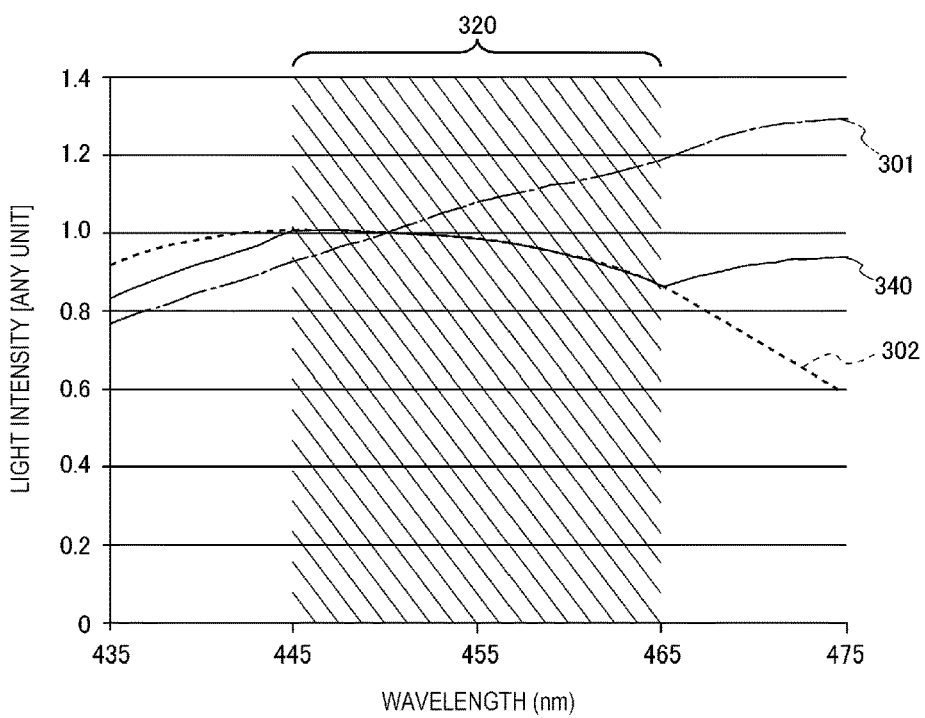
FIG. 8 is a graph illustrating spectral sensitivity characteristics of the measurement unit including a Z filter.

FIG. 8 is a graph illustrating the spectral sensitivity characteristics of the measurement unit 177 including the Z filter 211.

The curve 301 indicated by a one-dot chain line in FIG. 8 corresponds to the spectral sensitivity characteristics of the imaging unit 220, that is, to the spectral transmittance of the B filter 255. The curve 302 indicated by a broken line in FIG. 8 indicates the spectral sensitivity characteristics of the color matching function z(λ). A curve 340 indicated by a solid line in FIG. 8 indicates the spectral transmittance of the optical filter 240 configured by the Z filter 211 and the B filter 255. The Z filter 211 is a filter that converts the transmittance characteristics of the blue light into the transmittance characteristics of the Z value in the XYZ color system, in the wavelength range of the B light in combination with the B filter 255. That is, the optical filter 211 has transmittance characteristics causing the spectral sensitivity characteristics relating to the blue color constituting the RGB color system to correspond to the spectral sensitivity characteristics of the color matching function z(λ) constituting the XYZ color system, in the wavelength range of the B light.

The spectral transmittance of the Z filter 211 is adjusted by the product with the spectral transmittance of the B filter 255 constituting the color filter 222 so as to completely or substantially coincide with the spectral sensitivity of the color matching function z(λ). That is, the spectral transmittance of the optical filter constituted by the Z filter 211 and the B filter 255 completely or substantially coincides with the spectral sensitivity of the color matching function z(λ).

Therefore, when the B light transmitted through the Z filter 211 and the color filter 222 is imaged by the imaging unit 220, the spectral sensitivity of the imaging unit 220 completely or substantially coincides with the spectral sensitivity of the color matching function $z(\lambda)$. Thus, it is possible to measure the color light projected by the projection unit 150 at sensitivity close to the sensitivity of the human eyes by the measurement unit 177 and to perform the measurement with high accuracy without being influenced by variation of the wavelength of the B light.

The Z filter 211 is adjusted by the product with the spectral transmittance of the color filter 222 in a preset wavelength range, for example, in a range of 445 nm to 465 nm being the wavelength range of the B light so as to be identical to the spectral sensitivity of the color matching function $z(\lambda)$. Therefore, the Z filter 211 is created more easily than a case where the Z filter 211 is created to have spectral transmittance adjusted such that the spectral sensitivity of the imaging unit 220 coincides with the spectral sensitivity of the color matching function $z(\lambda)$ in the entirety of a visible region.

Figure 9:
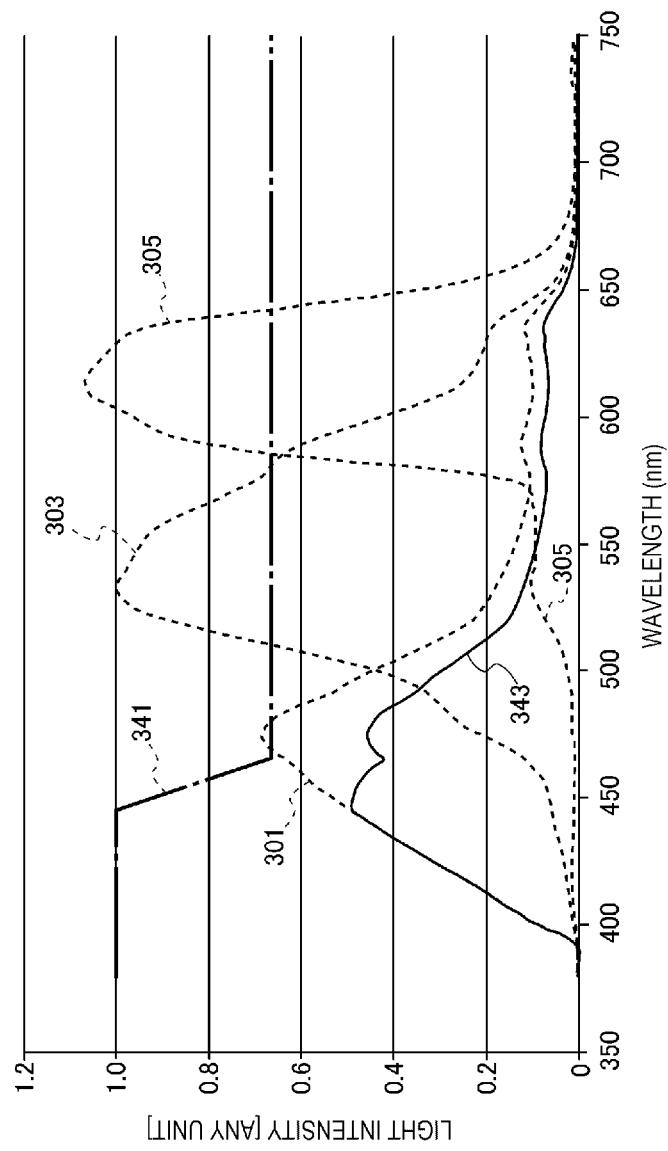
FIG. 9 is a graph illustrating spectral transmittance of an optical filter provided in the measurement unit.

FIG. 9 is a graph illustrating the spectral transmittance of the optical filter 240 provided in the measurement unit 177.

The curves 301, 303, and 305 indicated by broken lines in FIG. 9 correspond to the spectral sensitivity of the imaging unit 220 that images the B light, that is, to the spectral transmittance of the B filter 255, the G filter 253, and the R filter 251, similar to the curves 301, 303, and 305 in FIG. 5. A curve 341 indicated by a one-dot chain line in FIG. 9 indicates the spectral transmittance of the Z filter 211. A curve 343 indicated by a solid line in FIG. 9 indicates the spectral transmittance of the optical filter 240 constituted by the Z filter 211 and the B filter 255.

As clear with reference to FIG. 9, the spectral transmittance of the Z filter 211 has transmittance which is not 0% but has a predetermined value to correspond to the spectral characteristics of the B light, in a range of 445 nm to 465 nm being the wavelength range of the B light. The spectral transmittance of the Z filter 211 is set to be reduced as the wavelength becomes longer, in the wavelength range of the B light. The spectral transmittance of the Z filter 211 is set such that the transmittance in the wavelength range of the B light is higher than the transmittance in the wavelength range of the R light and the G light. The spectral transmittance of the Z filter 211 is set to be preset transmittance in a wavelength range higher than 465 nm being an upper limit of the wavelength range of the B light, that is, in the wavelength range of the R light and the G light. Thus, the Z filter causes at least a portion of the R light and the G light to be transmitted through the Z filter without cutting off the R light and the G light. Therefore, the spectral transmittance of the optical filter 240, which is indicated by the curve 343 is not 0% but has a predetermined value in the wavelength range of the R light and the G light.

Figure 10:
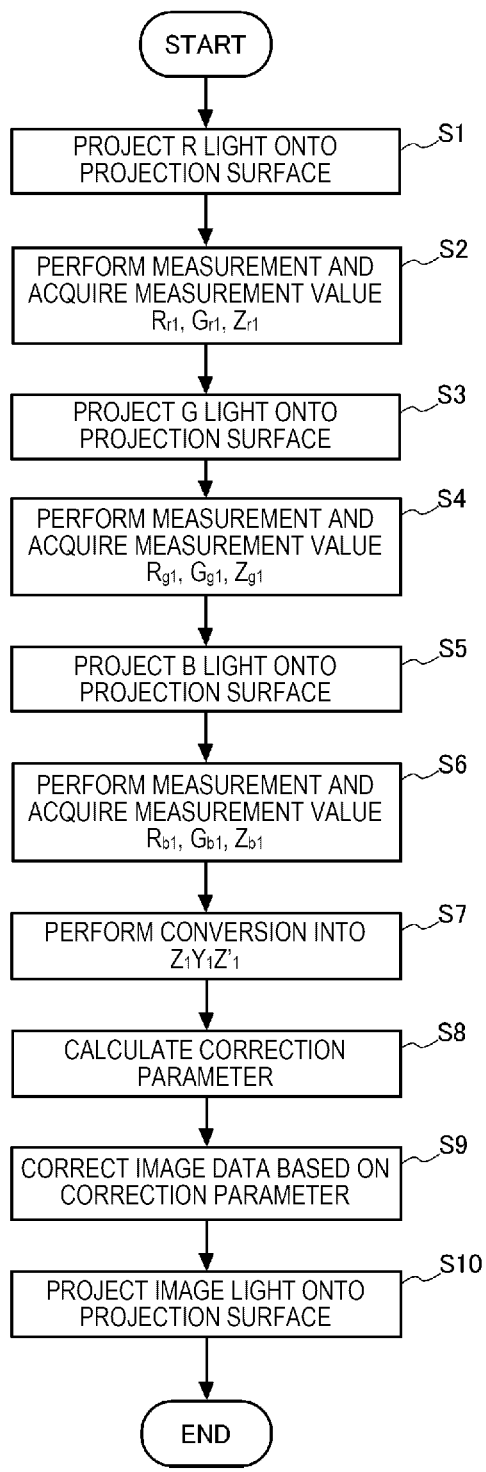
FIG. 10 is a flowchart illustrating an operation of a correction parameter generation unit.

FIG. 10 is a flowchart illustrating the operation of the projector 100.

The operation of the projector 100 will be described with reference to FIG. 10.

For example, when a preset period has elapsed from the previous measurement of an image by the imaging unit 220, or when an operation of color correction by the remote controller 5 or the operation unit 171 is received, the control unit 110 projects the R light being red single color light to the projection unit 150 (Step S1). For example, the control unit 110 may control the image processing unit 165 such that the transmittance of the B panel 131 and the G panel 135 is set to 0%, and the transmittance of the R panel 133 is set to 100%. Specifically, the control unit 110 controls the image processing unit 165 to process image data of the red single color and to output an image signal corresponding to the image data after the processing to the liquid crystal panel driver 155. The liquid crystal panel driver 155 that receives the input of the image signal corresponding to the red single color controls the transmittance of the B panel 131 and the G panel 135 to be 0% and controls the transmittance of the R panel 133 to be 100%.

The control unit 110 may control the light source driving unit 153 to turn off the laser light source 122 and to turn on only the laser light source 121. At this time, the control unit 110 controls the image processing unit 165 such that the transmittance of the G panel 135 is set to 0%, and the transmittance of the R panel 133 is set to 100%.

Then, the control unit 110 controls the measurement unit 177 to perform measurement and acquires a measurement value from the measurement unit 177 (Step S2). Here, the control unit 110 acquires $R_{r1}$ as an R component, $G_{r1}$ as a G component, and $Z_{r1}$ as a Z component, as the measurement value. Step S2 corresponds to "a measurement step" in the present disclosure. The measurement value ($R_{r1}$, $G_{r1}$, $Z_{r1}$) illustrated in FIG. 4 is obtained. "$R_{r1}$" and "$G_{r1}$" correspond to "a first measurement value" in the present disclosure, and $Z_{r1}$ corresponds to "a second measurement value" in the present disclosure.

The Z filter 211 has transmittance characteristics in which light is transmitted through the Z filter at predetermined transmittance in the wavelength range of the R light which is a wavelength range higher than the wavelength range of the B light. Therefore, it is possible to measure light intensity of the R light by the imaging unit 220 even though the Z filter 211 is disposed in front of the imaging lens 221.

The measurement value $R_{r1}$ is a measurement value corresponding to an output of the light receiving element 223 receiving the R light passing through the Z filter 211 and the R filter 251 of the color filter 222. The measurement value $G_{r1}$ is a measurement value corresponding to an output of the light receiving element 223 receiving the R light passing through the Z filter 211 and the G filter 253 of the color filter 222. The measurement value $Z_{r1}$ is a measurement value corresponding to an output of the light receiving element 223 receiving the R light passing through the Z filter 211 and the B filter 255 of the color filter 222.

Then, the control unit 110 changes the color light projected onto the projection surface 180 from the R light to the G light and projects the G light onto the projection surface 180 (Step S3). For example, the control unit 110 controls the image processing unit 165 such that the transmittance of the B panel 131 and the R panel 133 is set to 0%, and the transmittance of the G panel 135 is set to 100%. The control unit 110 may turn off the laser light source 122 used for generating the blue light and turn on only the laser light source 121. At this time, the control unit 110 controls the image processing unit 165 such that the transmittance of the R panel 133 is set to 0%, and the transmittance of the G panel 135 is set to 100%.

The control unit 110 controls the measurement unit 177 to perform measurement and acquires the measurement value from the measurement unit 177 (Step S4). Here, the control unit 110 acquires $R_{g1}$ as the R component, $G_{g1}$ as the G component, and $Z_{g1}$ as the Z component, as the measurement value. Step S4 corresponds to "the measurement step" in the present disclosure. The measurement value ($R_{g1}$, $G_{g1}$, $Z_{g1}$) illustrated in FIG. 4 is obtained. "$R_{g1}$" and "$G_{g1}$" correspond to "the first measurement value" in the present disclosure, and $Z_{g1}$ corresponds to "the second measurement value" in the present disclosure.

The Z filter 211 has transmittance characteristics in which light is transmitted through the Z filter at predetermined transmittance in the wavelength range of the G light which is a wavelength range higher than the wavelength range of the B light. Therefore, it is possible to measure light intensity of the G light by the imaging unit 220 even though the Z filter 211 is disposed in front of the imaging lens 221.

The measurement value $R_{g1}$ is a measurement value corresponding to an output of the light receiving element 223 receiving the G light passing through the Z filter 211 and the R filter 251 of the color filter 222. The measurement value $G_{g1}$ is a measurement value corresponding to an output of the light receiving element 223 receiving the G light passing through the Z filter 211 and the G filter 253 of the color filter 222. The measurement value $Z_{g1}$ is a measurement value corresponding to an output of the light receiving element 223 receiving the G light passing through the Z filter 211 and the B filter 255 of the color filter 222.

Then, the control unit 110 changes the color light projected onto the projection surface 180 from the G light to the B light and projects the B light onto the projection surface 180 (Step S5). For example, the control unit 110 controls the image processing unit 165 such that the transmittance of the R panel 133 and the G panel 135 is set to 0%, and the transmittance of the B panel 131 is set to 100%. The control unit 110 may turn off the laser light source 121 used for generating the R light and the G light and turn on only the laser light source 122. The spectral transmittance of the Z filter 211 is set such that the transmittance in the wavelength range of the B light is higher than the transmittance in the wavelength range of the R light and the G light.

The control unit 110 controls the measurement unit 177 to perform measurement and acquires the measurement value from the measurement unit 177 (Step S6). Here, the control unit 110 acquires $R_{b1}$ as the R component, $G_{b1}$ as the G component, and $Z_{b1}$ as the Z component, as the measurement value. Step S6 corresponds to "the measurement step" in the present disclosure. The measurement value ($R_{b1}$, $G_{b1}$, $Z_{b1}$) illustrated in FIG. 4 is obtained. "$R_{b1}$" and "$G_{b1}$" correspond to "the first measurement value" in the present disclosure, and $Z_{b1}$ corresponds to "the second measurement value" in the present disclosure.

The optical filter 240 constituted by the Z filter 211 and the B filter 255 has characteristics causing the spectral sensitivity characteristics relating to the blue color to correspond to the spectral sensitivity characteristics of the color matching function $z(\lambda)$ constituting the XYZ color system, in the wavelength range of the B light.

The measurement value $R_{b1}$ is a measurement value corresponding to an output of the light receiving element 223 receiving the B light passing through the R filter 251. The measurement value $G_{b1}$ is a measurement value corresponding to an output of the light receiving element 223 receiving the B light passing through the G filter 253. The measurement value $Z_{b1}$ is a measurement value corresponding to an output of the light receiving element 223 receiving the B light passing through the Z filter 211 and the B filter 255 of the color filter 222.

Then, the control unit 110 converts the $R_1G_1Z_1$ value being the measurement value measured by projecting the R light, the G light, and the B light onto the projection surface 180 into the $X_1Y_1Z_1$ value (Step S7). With the conversion, the conversion values ($X_{r1}$, $Y_{r1}$, $Z'_{r1}$), ($X_{g1}$, $Y_{g1}$, $Z'_{g1}$), and ($X_{b1}$, $Y_{b1}$, $Z'_{b1}$) illustrated in FIG. 4 are obtained. The control unit 110 converts the $R_1G_1Z_1$ value into a $X_1Y_1Z'_1$ value by a conversion expression (2) described below. $X_{r1}$, $Y_{r1}$, $Z'_{r1}$, $X_{g1}$, $Y_{g1}$, $Z'_{g1}$, $X_{b1}$, $Y_{b1}$, and $Z'_{b1}$ correspond to "the conversion values" in the present disclosure.

The $R_1$ value in the $R_1G_1Z_1$ value includes $R_{r1}$ measured by projecting the R light, $R_{g1}$ measured by projecting the G light, and $R_{b1}$ measured by projecting the B light. The $G_1$ value in the $R_1G_1Z_1$ value includes $G_{r1}$ measured by projecting the R light, $G_{g1}$ measured by projecting the G light, and $G_{b1}$ measured by projecting the B light. The $Z_1$ value in the $R_1G_1Z_1$ value includes $Z_{r1}$ measured by projecting the R light, $Z_{g1}$ measured by projecting the G light, and $Z_{b1}$ measured by projecting the B light.

The $X_1$ value in the $X_1Y_1Z_1$ value being the values after the conversion includes $X_{r1}$ as the R component, $X_{g1}$ as the G component, and $X_{b1}$ as the B component. The $Y_1$ value in the $X_1Y_1Z_1$ value being the values after the conversion includes $Y_{r1}$ as the R component, $Y_{g1}$ as the G component, and $Y_{b1}$ as the B component.

$$\begin{pmatrix} X_{r1} & X_{g1} & X_{b1} \\ Y_{r1} & Y_{g1} & Y_{b1} \\ Z'_{r1} & Z'_{g1} & Z'_{b1} \end{pmatrix} = M \times \begin{pmatrix} R_{r1} & R_{g1} & R_{b1} \\ G_{r1} & G_{g1} & G_{b1} \\ Z_{r1} & Z_{g1} & Z_{b1} \end{pmatrix} \quad (2)$$

$Z'_{r1}$ in Expression (2) is the R component of the Z value after the calculation by Expression (2). $Z'_{g1}$ is the G component of the Z value after the calculation by Expression (2). $Z'_{b1}$ is the B component of the Z value after the calculation by Expression (2).

If the $R_1G_1Z_1$ value being the measurement value of the measurement unit 177 is converted into the $X_1Y_1Z_1$ value, the control unit 110 calculates the correction parameter used in color correction based on the converted $X_1Y_1Z_1$ value and the aimed value $X_0Y_0Z_0$ (Step S8). Step S8 corresponds to "a generation step" in the present disclosure. The correction parameter is calculated based on the conversion value ($X_{r1}$, $Y_{r1}$, $Z'_{r1}$) and the aimed value ($X_{r0}$, $Y_{r0}$, $Z_{r0}$). Similarly, the correction parameter is calculated based on the conversion value ($X_{g1}$, $Y_{g1}$, $Z'_{g1}$) and the aimed value ($X_{g0}$, $Y_{g0}$, $Z_{g0}$) Similarly, the correction parameter is calculated based on the conversion value ($X_{b1}$, $Y_{b1}$, $Z'_{b1}$) and the aimed value ($X_{b0}$, $Y_{b0}$, $Z_{b0}$). The control unit 110 stores the calculated correction parameters in the memory 111.

If a supply of image data from the image supply device starts, the control unit 110 reads the correction parameter from the memory 111 and outputs the read correction parameter to the image processing unit 165.

The image processing unit 165 develops the image data received by the interface 161 in the frame memory 163. The image processing unit 165 performs correction processing of correcting the brightness or the hue of the developed image data by using the correction parameter acquired from the control unit 110 (Step S9). If the correction processing ends, the image processing unit 165 reads the image data developed in the frame memory 163 and outputs the image data to the liquid crystal panel driver 155 in a form of an image signal. The liquid crystal panel driver 155 generates a driving voltage based on the image signal input from the image processing unit 165. The liquid crystal panel driver 155 drives the B panel 131, the R panel 133, and the G panel 135 in accordance with the generated driving voltage so as to draw an image in the B panel 131, the R panel 133, and the G panel 135. Thus, the image light corrected by the correction parameter is projected onto the projection surface 180 (Step S10).

As described above, in the embodiment, the projector 100 includes the laser light sources 121 and 122 as the solid light source, the light source optical system 127, the optical modulation unit 130, the projection unit 150, the measurement unit 177, and the correction parameter generation unit 115.

The laser light sources 121 and 122 emit the blue light as the first color light.

The light source optical system 127 obtains yellow light as color light having a predetermined color, by causing the blue light emitted by the laser light source 122 to abut against the phosphor wheel 125. The light source optical system 127 separates the obtained yellow light into red light and green light.

The optical modulation unit 130 modulates the red light, the green light, and the blue light.

The projection unit 150 projects image light obtained by composing the red light, the green light, and the blue light modulated by the optical modulation unit 130, onto the projection surface 180.

The measurement unit 177 measures the color of the image light of the image formed on the projection surface 180 in terms of each color of R, G, and B constituting the RGB color system as the first color system. The measurement unit 177 measures the Z value in the tristimulus value constituting the XYZ color system.

The correction parameter generation unit 115 obtains the conversion value obtained by converting the measurement value of the color in the RGB color system, which is measured by the measurement unit 177, into the color in the XYZ color system. The correction parameter generation unit 115 generates the correction parameter based on the obtained conversion value and the Z value measured by the measurement unit 177.

The measurement unit 177 includes the optical filter 240 having transmittance characteristics corresponding to the spectral characteristics of the B light, in the wavelength range of the B light.

Thus, it is possible to perform color correction of the image light by measuring the color of the image light with high accuracy.

The optical filter 240 has transmittance characteristics causing the spectral sensitivity characteristics relating to the color constituting the RGB color system to correspond to the color matching function of the color constituting the XYZ color system, in the wavelength range of the B light among the spectral sensitivity characteristics of the measurement unit 177.

Thus, the color in the XYZ color system among the colors of the image light of the image formed on the projection surface 180 may be measured by the measurement unit 177.

The optical filter 240 includes the Z filter 211 as the first optical filter and the B filter 255 as the second optical filter.

The B filter 255 has transmittance characteristics in which the transmittance shows a peak in the wavelength range of the B light.

The B filter 255 has transmittance characteristics causing spectral sensitivity characteristics relating to the blue color in the wavelength range of the B light to correspond to the spectral sensitivity of the color matching function $z(\lambda)$ of the color constituting the XYZ color system, in combination with the transmittance characteristics of the B filter 255.

Thus, the Z filter 211 is combined with the B filter 255 of the color filter 222 in the imaging unit 220, and thereby it is possible to measure the color in the XYZ color system by the measurement unit 177.

The Z filter 211 has transmittance characteristics in which the red light and the green light are transmitted through the Z filter 211 in a wavelength range higher than the wavelength range of the blue light.

Thus, it is possible to measure the color of the red light and the green light by the measurement unit 177 including the Z filter 211 and to reduce a measurement time.

In the Z filter 211, the transmittance in a wavelength range higher than the wavelength range of the blue light is lower than the transmittance in the wavelength range of the blue light.

Thus, it is possible to measure the Z value in the XYZ color system based on the blue light with high accuracy.

The measurement unit 177 includes the light receiving element 223.

The color filter 222 constituting the optical filter 240 includes the R filter 251 having transmittance characteristics in which the transmittance shows a peak in the wavelength range of the red light and the G filter 253 having transmittance characteristics in which the transmittance shows a peak in the wavelength range of the green light.

The R filter 251, the G filter 253, and the B filter 255 are arranged to be correlated to any of the pixels constituting the light receiving element 223.

Thus, it is possible to measure the color of the red light transmitted through the R filter 251 and the color of the green light transmitted through the G filter 253.

The Z filter 211 is disposed to be correlated to each pixel constituting the light receiving element 223.

Thus, it is possible to receive the color light transmitted through the Z filter 211 by the light receiving element 223.

The first color system is the RGB color system. The second color system is the XYZ color system. The measurement unit 177 outputs the measurement value of color of R and G constituting the RGB color system and outputs the measurement value of the Z value for at least one color among the X, Y, and Z constituting the XYZ color system.

Thus, it is possible to generate the correction parameter based on the conversion value obtained by converting the R value and the G value into an X value and a Y value in the XYZ color system and the measured Z value in the XYZ color system. Since the Z value is directly measured, it is not necessary that the RGB value is converted into the Z value. Thus, it is possible to reduce the error included in the Z value.

Modification Example 1

In the above-descriptions of the flowchart, a case of correcting the color of image light projected by one projector 100 is described as an example. However, the present disclosure may be applied to a case of performing color matching of image light projected by two projectors 100.

Figure 11:
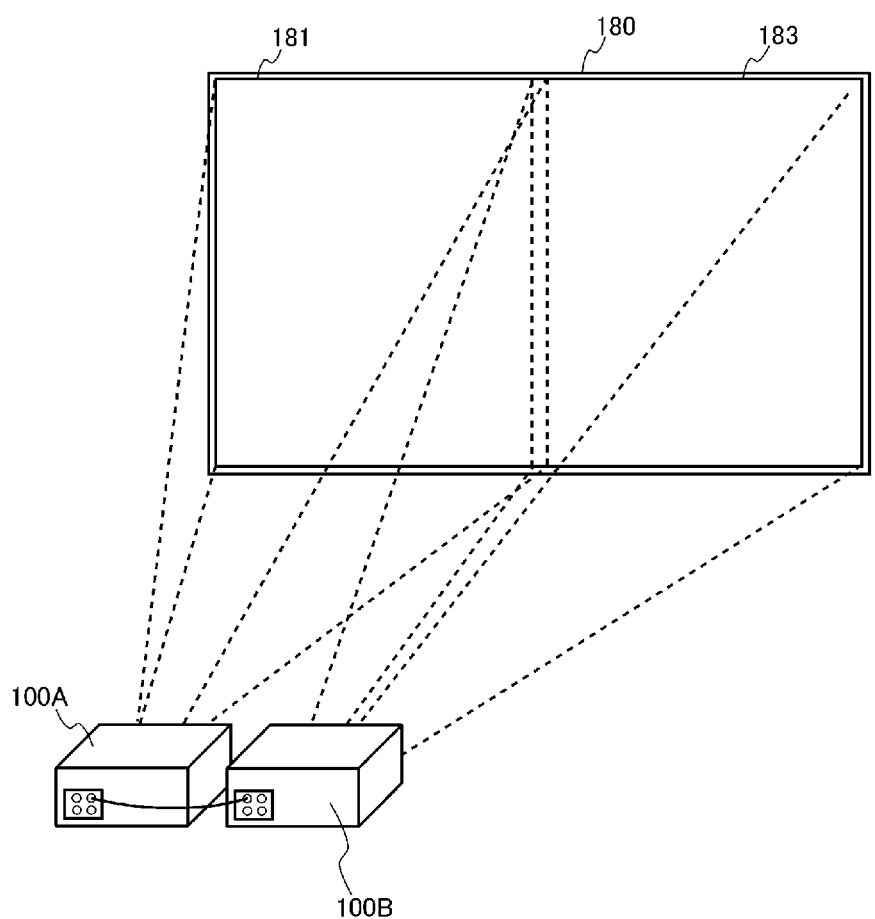
FIG. 11 is a system configuration diagram.

FIG. 11 is a diagram illustrating a system configuration in the modification example.

For example, two projectors 100 which are a projector 100A and a projector 100B as the projector 100 are prepared. The projector 100A and the projector 100B are coupled to each other to be capable of communicating with each other by a wired cable or wireless communication. The projector 100A and the projector 100B are arranged in parallel in a horizontal direction of the projection surface 180.

The projector 100A projects image light in a projection region on the left side of the projection surface 180. The projector 100B projects image light in a projection region on the right side of the projection surface 180. The projection region in which the projector 100A projects an image is referred to as a projection region 181. The projection region in which the projector 100B projects an image is referred to as a projection region 183. The projector 100A includes the measurement unit 177. The measurement unit 177 has an angle of view capable of measuring the projection regions 181 and 183. In order to distinguish the projection region 181 and the projection region 183 from the image obtained by imaging of the imaging unit 220 of the measurement unit 177, the projector 100A projects a preset pattern image in the projection region 181, and the imaging unit 220 performs imaging of the projected image. The projector 100A specifies a region in which the pattern image is imaged in the image, as the projection region 181. Similarly, the projector 100A causes the projector 100B to project a preset pattern image in the projection region 183, and the imaging unit 220 performs imaging of the projected image. The projector 100A specifies a region in which the pattern image is imaged in the image, as the projection region 183.

The projector 100A sequentially projects the R light, the G light, and the B light in the projection region 181 and causes the measurement unit 177 to perform measurement, in accordance with the flowchart illustrated in FIG. 10. Specifically, the projection region 181 in which the R light is projected is measured, and thus Rr as the R component, Gr as the G component, and Zr as the Z component are measured. The projection region 181 in which the G light is projected is measured, and thus Rg as the R component, Gg as the G component, and Zg as the Z component are measured. The projection region 181 in which the B light is projected is measured, and thus Rb as the R component, Gb as the G component, and Zb as the Z component are measured. Then, the projector 100A converts the RGZ values into the XYZ values with Expression (2) described above.

Then, the projector 100A instructs the projector 100B to project the R light. The projector 100B projects the R light in the projection region 183 in accordance with the instruction of the projector 100A. If the projector 100B projects the R light, the projector 100A causes the measurement unit 177 to measure the projection region 183 and to measure Rr as the R component, Gr as the G component, and Zr as the Z component. Similarly, if the projector 100B projects the G light, the projector 100A causes the measurement unit 177 to measure the projection region 183 and to measure Rg as the R component, Gg as the G component, and Zg as the Z component. Similarly, if the projector 100B projects the B light, the projector 100A causes the measurement unit 177 to measure the projection region 183 and to measure Rb as the R component, Gb as the G component, and Zb as the Z component.

The projector 100A converts the RGB values into the XYZ values with Expression (2) described above.

The projector 100A generates the correction parameter of setting the XYZ values obtained by converting the measurement value of the projection region 181 as the aimed value and setting the XYZ values obtained by converting the measurement value of the projection region 183 as the aimed value. The projector 100A transmits the generated correction parameter to the projector 100B. The projector 100B corrects the image data by using the correction parameter received from the projector 100A and projects the image light in the projection region 183 based on the corrected image data.

Modification Example 2

In the above-described embodiment, the configuration in which the projector 100 includes the measurement unit 177 and the correction parameter generation unit 115 is described. However, the correction parameter generation unit 115 may be provided on the outside of the projector 100.

Figure 12:
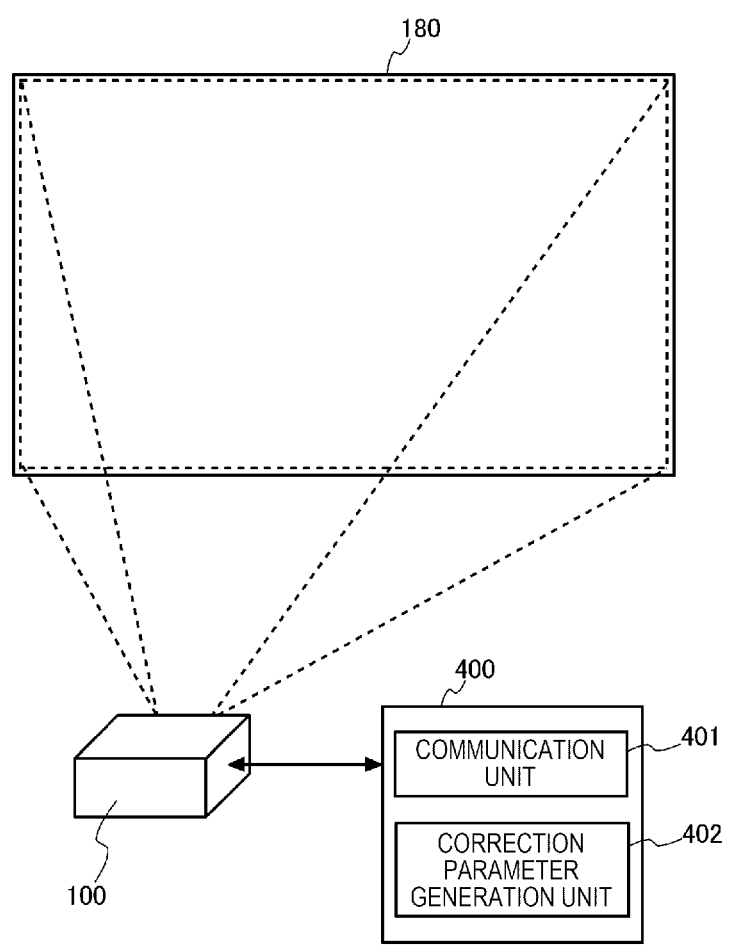
FIG. 12 is a system configuration diagram illustrating a color correction system.

FIG. 12 is a system configuration diagram illustrating a color correction system including a control device 400 and the projector 100. The control device 400 includes a communication unit 401 and a correction parameter generation unit 402. The control device 400 is realized by a computer including a processor and a memory, for example. The control device 400 corresponds to "a correction parameter generation device" in the present disclosure.

The communication unit 401 includes a connector for wired coupling and an interface circuit corresponding to the connector. The communication unit 401 is coupled to the projector 100 in a wired manner. Illustrations of the connector and the interface circuit are omitted.

The correction parameter generation unit 402 receives the measurement value measured by the measurement unit 177 in the projector 100 from the projector 100. The correction parameter generation unit 402 generates the correction parameter based on the R value, the G value, the B value, and the Z value being the received measurement value. The correction parameter generation unit 402 transmits the generated correction parameter to the projector 100.

The correction parameter generation unit 402 may be realized by the processor executing a control program or may be configured by a hardware circuit such as a field-programmable gate array (FPGA) or an application specific integrated circuit (ASIC).

An imaging device such as a camera, which is provided on the outside of the projector 100 may be used instead of the measurement unit 177. For example, the measurement unit may be provided in the above-described control device 400, and the measurement unit may measure the color of the image light of the image formed on the projection surface 180.

The above-described embodiment is a preferred embodiment of the present disclosure. However, the present disclosure is not limited thereto, and various modifications can be made in a range without departing from the gist of the present disclosure.

For example, in the above-described embodiment, the projection unit 150 projects the R light, the G light, and the B light onto the projection surface 180. However, the gradation of each of the R light, the G light, and the B light may be changed, and the measurement unit 177 may perform measurement at the changed gradations and output the measurement value. With such a configuration, it is possible to further improve the accuracy of color correction.

The control method of the projector in the present disclosure may be realized by a computer in the projector 100 or an external device coupled to the projector 100. In this case, the control method of the projector in the present disclosure may be configured in a form of a program executed by a computer in order to realize the method. The control method of the projector may be configured in a form of a recording medium in which such a program is recorded so as to be readable by a computer or a transmission medium for transmitting the program.

A process unit of the flowchart illustrated in FIG. 10 is divided in accordance with the main processing content in order to easily understand the processing of the control unit 110 of the projector 100. The present disclosure is not limited by the division method and names of process units illustrated in in the flowchart in FIG. 10. The processing of the control unit 110 may be divided into more process units, in accordance with the processing content, or division may be performed such that one processing unit includes more processing. The process order of the flowchart is also not limited to the example illustrated in the flowchart.

The program executed by the processor 113 may be stored in a storage device, a storage medium, or the like which is configured to be separate from the projector 100, in addition to the memory 111. The processor 113 may acquire and execute the program stored in an external device.

In the above-described embodiment, the configuration in which the optical modulation unit 130 includes a transmissive liquid crystal panel is described as an example. However, the liquid crystal panel may be a reflective liquid crystal panel. The projector 100 may be configured by digital light processing (DLP) using a digital micromirror device (DMD) instead of the liquid crystal panel.

What is claimed is:

1. A projector comprising:
   a solid light source that emits first color light;
   a light source optical system that obtains color light having a predetermined color by causing the first color light emitted by the solid light source to abut against a phosphor, and separates the color light having the predetermined color into second color light and third color light by spectrally dividing the obtained color light having the predetermined color;
   an optical modulation unit that modulates the first color light, the second color light, and the third color light;
   a projection unit that projects image light obtained by composing the first color light, the second color light, and the third color light modulated by the optical modulation unit, onto a projection surface;
   a measurement unit that measures a color of an image formed on the projection surface by the image light, in terms of a plurality of colors constituting a first color system and at least one of colors constituting a second color system; and
   a correction parameter generation unit that generates a correction parameter based on a conversion value and a second measurement value of at least the one of the colors constituting the second color system, which is measured by the measurement unit, the conversion value being obtained by converting a first measurement value of the color in the first color system, which is measured by the measurement unit, into the color in the second color system, wherein
   the measurement unit includes an optical filter having transmittance characteristics corresponding to spectral characteristics of the first color light, in a wavelength range of the first color light.

2. The projector according to claim 1, wherein
   the optical filter has transmittance characteristics causing spectral sensitivity characteristics for the color constituting the first color system in the wavelength range of the first color light among spectral sensitivity characteristics of the measurement unit to correspond to a color matching function of the color constituting the second color system.

3. The projector according to claim 1, wherein
   the optical filter includes a first optical filter and a second optical filter,
   the second optical filter has transmittance characteristics in which transmittance shows a peak in the wavelength range of the first color light, and
   the first optical filter has transmittance characteristics causing spectral sensitivity characteristics for the color constituting the first color system in the wavelength range of the first color light to correspond to a color matching function of the color constituting the second color system, in combination with the transmittance characteristics of the second optical filter.

4. The projector according to claim 3, wherein
   the first optical filter has transmittance characteristics in which the second color light and the third color light are transmitted in a wavelength range higher than the wavelength range of the first color light.

5. The projector according to claim 3, wherein
   in the first optical filter, transmittance in a wavelength range higher than the wavelength range of the first color light is smaller than transmittance in the wavelength range of the first color light.

6. The projector according to claim 3, wherein
   the measurement unit includes a light receiving element,
   the optical filter includes a third optical filter having transmittance characteristics in which transmittance shows a peak in a wavelength range of the second color light and a fourth optical filter having transmittance characteristics in which transmittance shows a peak in a wavelength range of the third color light, and
   the second optical filter, the third optical filter, and the fourth optical filter are disposed to correspond to any of pixels constituting the light receiving element.

7. The projector according to claim 6, wherein
   the first optical filter is disposed to correspond to each of the pixels constituting the light receiving element.

8. The projector according to claim 1, wherein
   the first color system is an RGB color system,
   the second color system is an XYZ color system, and
   the measurement unit outputs a measurement value of each color of R and G constituting the RGB color system and Z constituting the XYZ color system.

9. A color correction system comprising:
   a projector including
      a solid light source that emits first color light,
      a light source optical system that obtains color light having a predetermined color by causing the first color light emitted by the solid light source to abut against a phosphor, and separates the color light having the predetermined color into second color light and third color light by spectrally dividing the obtained color light having the predetermined color,
      an optical modulation unit that modulates the first color light, the second color light, and the third color light, and
      a projection unit that projects image light obtained by composing the first color light, the second color light, and the third color light modulated by the optical modulation unit, onto a projection surface;
   a measurement unit that measures a color of an image formed on the projection surface by the image light, in terms of a plurality of colors constituting a first color system and at least one of colors constituting a second color system; and
   a correction parameter generation device that generates a correction parameter based on a conversion value and a second measurement value of at least the one of the colors constituting the second color system, which is measured by the measurement unit, the conversion value being obtained by converting a first measurement value of the color in the first color system, which is measured by the measurement unit, into the color in the second color system, wherein
   the measurement unit includes an optical filter having transmittance characteristics corresponding to spectral characteristics of the first color light, in a wavelength range of the first color light.

10. A control method of a projector that modulates first color light emitted by a solid light source, second color light obtained based on the first color light, and third color light and projects image light obtained by composing the modulated first color light, second color light, and third color light onto a projection surface, the method comprising:

measuring a color of an image formed on the projection surface by the image light in terms of a plurality of colors constituting a first color system and at least one of colors constituting a second color system, by a measurement unit; and generating a correction parameter based on a conversion value and a second measurement value of at least the one of the colors constituting the second color system, which is measured by the measurement unit, the conversion value being obtained by converting a first measurement value of the color in the first color system, which is measured by the measurement unit, into the color in the second color system, wherein in the measuring of the color, the color is measured in terms of at least the one of the colors constituting the second color system, by the measurement unit including an optical filter having transmittance characteristics corresponding to spectral characteristics of the first color light, in a wavelength range of the first color light.

11. A projector comprising:

a solid light source that emits first color light;

a light source optical system that obtains color light having a predetermined color by causing the first color light emitted by the solid light source to abut against a phosphor, and separates the color light having the predetermined color into second color light and third color light by spectrally dividing the obtained color light having the predetermined color;

an optical modulation unit that modulates the first color light, the second color light, and the third color light;

a projection unit that projects image light obtained by composing the first color light, the second color light, and the third color light modulated by the optical modulation unit, onto a projection surface; and a correction parameter generation unit that generates a correction parameter based on a conversion value and a second measurement value of at least one of colors constituting second color system, which is measured by a measurement unit, the conversion value being obtained by converting a first measurement value of a color in a first color system, which is measured by the measurement unit, into the color in the second color system, the measurement unit measuring a color of an image formed on the projection surface by the image light, in terms of a plurality of colors constituting the first color system and at least the one of the colors constituting the second color system, wherein the measurement unit includes an optical filter having transmittance characteristics corresponding to spectral characteristics of the first color light, in a wavelength range of the first color light.

* * * * *